United States Patent
Cho et al.

(10) Patent No.: US 6,372,138 B1
(45) Date of Patent: Apr. 16, 2002

(54) WASTEWATER TREATMENT METHOD FOR REMOVING ORGANIC MATTER AND NITROGEN, CARRIER USED THEREOF AND METHOD FOR MANUFACTURING THE CARRIER

(75) Inventors: Jae-hyun Cho, Yongin; Yong-hwan Kim, Seoul; Yong-woo Lee, Seoul; Won-kwon Lee, Seoul, all of (KR)

(73) Assignee: Samsung Engineering Co., Ltd. (KR)

( * ) Notice: Subject to any disclaimer, the term of this patent is extended or adjusted under 35 U.S.C. 154(b) by 0 days.

(21) Appl. No.: 09/647,150
(22) PCT Filed: Mar. 29, 1999
(86) PCT No.: PCT/KR99/00151
§ 371 Date: Sep. 27, 2000
§ 102(e) Date: Sep. 27, 2000
(87) PCT Pub. No.: WO99/50193
PCT Pub. Date: Oct. 7, 1999

(30) Foreign Application Priority Data

Mar. 31, 1998 (KR) ............................................. 98-11335
Oct. 10, 1998 (KR) ............................................. 98-42373

(51) Int. Cl.[7] ................................................. C02F 3/30
(52) U.S. Cl. .................. 210/605; 210/615; 210/616; 210/621; 210/626; 210/903; 210/151
(58) Field of Search ................................. 210/605, 615, 210/616, 621, 622, 626, 630, 150, 151, 903

(56) References Cited

U.S. PATENT DOCUMENTS

| | | | | |
|---|---|---|---|---|
| 3,817,857 A | * | 6/1974 | Torpey | 210/903 |
| 4,056,465 A | * | 11/1977 | Spector | 210/605 |
| 4,183,809 A | * | 1/1980 | Klapwijk et al. | 210/605 |
| 4,315,821 A | * | 2/1982 | Climenhage | 210/605 |
| 4,576,718 A | * | 3/1986 | Reisehl et al. | 210/616 |
| 4,867,883 A | * | 9/1989 | Dayyer et al. | 210/605 |
| 5,486,292 A | * | 1/1996 | Bair et al. | 210/150 |
| 5,595,893 A | * | 1/1997 | Pumetto, III et al. | 210/615 |
| 5,980,738 A | * | 11/1999 | Heithamp et al. | 210/150 |
| 6,007,712 A | * | 12/1999 | Tanaka et al. | 210/151 |
| 6,077,424 A | * | 6/2000 | Katsuhura et al. | 210/151 |

FOREIGN PATENT DOCUMENTS

| | | |
|---|---|---|
| DE | 39 16 679 | 11/1990 |
| EP | 0 247 212 | 12/1987 |
| EP | 0 504 019 | 9/1992 |
| EP | 0 593 834 | 4/1994 |
| JP | 7-39899 | 2/1995 |
| JP | 96-34103 | 10/1996 |
| JP | 9-314165 | 12/1997 |
| KR | 9842373 | 10/1998 |
| WO | 91/17123 | 11/1991 |
| WO | 92/06043 | 4/1992 |

* cited by examiner

*Primary Examiner*—Christopher Upton
(74) *Attorney, Agent, or Firm*—Burns, Doane, Swecker & Mathis, L.L.P.

(57) ABSTRACT

A wastewater treatment method for removing organic matter and nitrogen from wastewater. In the wastewater treatment method, an excessive amount of organic matter which prevents nitrifying bacteria from growing is removed in a leading aeration tank, and the conditions of the aeration tank are optimized using the nitrifying carrier to which a great amount of nitrifying bacteria can be attached for growth, such that the nitrifying bacteria can multiply therein. As a result, a large amount of wastewater can be treated within a short time, and it is possible to stably cope with a change in load of the organic matter of the wastewater. Thus, the wastewater treatment apparatus can be smaller, and an improvement in performance thereof can be expected. Also, the wastewater can be treated stably during the winter season when the activity of the nitrifying bacteria becomes low, so that the wastewater treatment method according to the present invention can be applied to most wastewater treatment plants, e.g., sewage treatment plants, excrement treatment plants, livestock and industrial wastewater treatment plants and the like.

18 Claims, 1 Drawing Sheet

WASTEWATER TREATMENT METHOD FOR REMOVING ORGANIC MATTER AND NITROGEN, CARRIER USED THEREOF AND METHOD FOR MANUFACTURING THE CARRIER

TECHNICAL FIELD

The present invention relates to a method for treating wastewater containing organic matter and nitrogen, and more particularly, to a wastewater treatment method utilizing a carrier capable of enhancing the removal efficiency of organic matter and nitrogen.

BACKGROUND ART

An active sludge method, a basic wastewater treatment method, has been widely used in the secondary treatment of wastewater after it has undergone a first treatment, or in order to completely treat the original wastewater in aerobic conditions. In a general active sludge method, as the wastewater continuously flows into an aeration tank, microorganisms grow by intaking the organic matter of the wastewater such that the organic matter is decomposed, and the grown microorganisms coagulate to settle in a terminal settling tank. A portion of the precipitant returns to the aeration tank in the form of an active sludge, and the remaining portion is discarded as waste sludge, such that the amount of microorganisms in the aeration tank is maintained at a suitable level and the nitrogen and phosphorus are removed as the organic matter is decomposed.

Such an active sludge method has been acknowledged as an effective wastewater treatment method. However, this method is not suitable for effectively removing the organic matter and nitrogen at the same time from wastewater containing a high-concentration of organic matter and nitrogen, and increases the surplus sludge. In particular, when wastewater contains a high loading ratio of organic matter, bulking occurs in the settling tank, thereby lowering treatment efficiency. In addition, heterotrophic bacteria grow to excess due to the high loading ratio of the organic matter while growth of autotrophic bacteria which inherently grow slowly is suppressed, so that active nitrification is not possible.

To solve the above problems, a biofilm process has been developed in which a large number of microorganisms fixed to a carrier are used. According to the biological membrane process, it is necessary to maintain the number of microorganisms in an aeration tank, used for wastewater treatment, to a suitable level. To this end, a microorganism-attachable carrier is essential for suspended-growth or attached-growth of the microorganisms. Carrier for the purpose include porous plastics(presented by Sung-yong Choi, in *Journal of Korean Society on Water Quality*, Vol. 6, No. 1, page 31, 1990), active carbon fiber (Japanese Patent Application No. Heisei 5-167820), polyvinyl alcohol and active carbon (Japanese Patent Application No. Heisei 5-186723) or the like. The material of the carrier is low in hydrophilic properties, so that it is not easy to attach microorganisms to the carrier. Also, the microorganisms not attached to the carrier is low in growth rate, so that the microorganisms flows out of the aeration tank when the wastewater treatment tank is continuously operated.

Also, in the conventional biofilm process utilizing a fixed type carrier, because a biofilm is formed on the surface of the carrier in excess, the amount of dissolved oxygen (DO) supplied to nitrifying bacteria whose growth rate is relatively slow is not enough, so that it is hard to maintain the amount of the nitrifying bacterial to a suitable level. In addition, if the conventional biofilm membrane process utilizes a single carrier, and there is a limitation in the concentration of nitrogen removed.

Meanwhile, ammonia nitrogen of the wastewater is treated in two stages of nitrification and denitrification by a biological treatment method. That is, during nitrification, the ammonia nitrogen is changed into nitrate nitrogen ($NO_3$—N) by aerobic nitrifying bacteria, and during denitrification, denitrifying bacteria oxidize the organic matter using the nitrate nitrogen as an electron acceptor, instead of oxygen the amount of which is insufficient, and reduce the nitrate nitrogen to nitrogen ($N_2$). However, the activity of the nitrifying bacteria which are sensitive to a temperature decrease lowers during the winter season, thus the nitrogen removal efficiency is also rapidly lowered.

DISCLOSURE OF THE INVENTION

To solve the above problems, it is an object of the present invention to provide a method for stably and effectively treating wastewater containing a high-concentration of organic matter and nitrogen, by which the above-mentioned problems of the conventional biofilm process, such as bulking, biofilm slough-off or decrease in treatment efficiency during the winter season, can be solved.

According to an aspect of the present invention, there is provided a wastewater treatment method comprising the steps of: (a) denitrifying wastewater inflowed into an anoxic tank by reducing the nitrate nitrogen into gaseous nitrogen using denitrifying bacteria being resident in the anoxic tank, and organic matter of the inflowed wastewater; (b) making the carbon-to-nitrogen (C/N) ratio of the wastewater having undergone the step (a) suitable for a subsequent nitrification step after inflowing the wastewater into a first aeration tank by decomposing an excessive amount of organic matter using aerobic microorganisms attached to a carrier; (c) changing ammonia nitrogen of the wastewater having undergone the step (b) into nitrate nitrogen after inflowing the wastewater into a second aeration tank by using nitrifying bacteria attached to a carrier; (d) returning part of the wastewater having undergone the step (c) to the anoxic tank, and inflowing the remaining wastewater to a settling tank; and (e) returning part of the sludge discharged from the settling tank to the anoxic tank, discarding the remaining sludge as surplus sludge, and obtaining a supernatant separated from the sludge settled in the settling tank as the treated water.

Preferably, after the organic matter is decomposed by the aerobic microorganisms in the step (b), the resulting wastewater is directly sent to the step (d) if the load of ammonia nitrogen of the wastewater to be treated is small, thus omitting the step (c). Preferably, the wastewater passed through the step (a) is directly sent to the step (c) if the load by the organic matter of the wastewater to be treated is small, omitting the step (b).

Preferably, the carrier used in the step (b) comprises a foamed polymer, powdered active carbon attached to the foamed polymer, and an adhesive for sticking the powdered active carbon to the foamed polymer.

Preferably, the foamed polymer is polyurethane, polystyrene or polyethylene, having a sponge foam or non-woven fabric structure.

Preferably, the adhesive is a mixture of acrylic resin and styrene/butadiene Latex (S/B Latex) in a weight ratio of 70:30~90:10.

Preferably, the powdered active carbon and the adhesive exist in a weight ratio of 40:60~50:50.

According to another aspect of the present invention, there is provided a method for preparing the carrier, comprising the steps of: (a) forming a slurry by mixing an adhesive solution and a powdered active carbon in a weight ratio of 90:10~70:30; (b) coating the slurry on a foamed polymer, and evaporating solvent from the adhesive solution by heating the resulting product; and (c) molding the resulting product of the step (b).

Preferably, the heating of the step (b) is performed at 70~95° C. for 2~3 hours.

Preferably, the carrier used in the step (c) is a polyvinyl alcohol foam carrier or a cellulose fiber carrier.

Preferably, the cellulose carrier is prepared by the steps of: (a) molding a cellulose fiber into a planar shape; (b) infiltrating the planar cellulose fiber with a foaming composition containing polyvinyl alcohol, a cross- linking agent and a foaming agent; (c) foaming the resulting product of the step (b) by dehydrating; (d) infiltrating the resulting product of the step (c) with a reinforcing composition containing polyvinyl alcohol and a cross-linking agent; and (e) drying the resulting product of the step (d) taken out of the composition.

Preferably, the foaming composition comprises 0.5~5 wt % of polyvinyl alcohol, 0.2~5 wt % of cross-linking agent, 0.1~1 wt % of foaming agent, and solvent as the remainder.

Preferably, the reinforcing composition comprises 1~5 wt % of polyvinyl alcohol, 0.1~5 wt % of cross-linking agent, and solvent as the remainder.

Preferably, the cross-linking agent is melamine urea resin or polyamide polyamine epichlorhydrine (PPE).

Preferably, dehydration of the step (c) is performed such that the water content of the planar cellulose fiber before foaming is maintained at 20~50% based on the weight of the planar cellulose fiber.

Preferably, foaming in the step (c) is performed at 120~150° C. such that the volume of pores per unit gram of the foamed cellulose carrier on the dry basis is in the range of 0.3~4.5 cm$^3$.

BEST MODE FOR CARRYING OUT THE INVENTION

Figure 1:
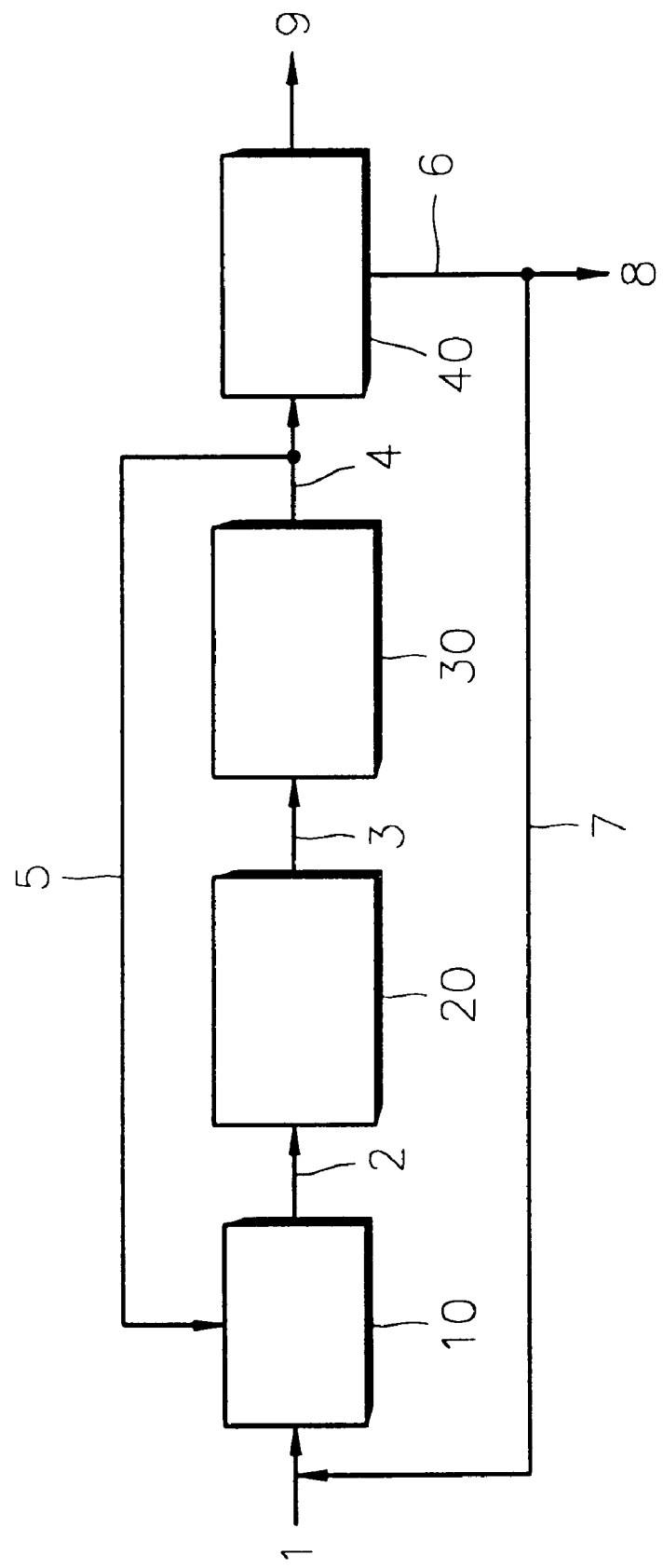
FIG. 1 is a schematic diagram illustrating a wastewater treatment method according to the present invention.

Referring to FIG. 1, wastewater 1 containing an organic matter and nitrogen flows into an anoxic tank 10. In the anoxic tank 10, oxidation of the organic matter and reduction of nitrate nitrogen ($NO_3$—N) occurs concurrently. That is, the organic matter of the influent wastewater is oxidized acting as an electron donor during denitrification, and the nitrate nitrogen contained in the influent wastewater and in return water 5 from a second aeration tank 30 accepts electrons to be reduced into nitrogen ($N_2$), thereby removing the organic matter and nitrogen from the wastewater.

However, in the case where the wastewater containing a large amount of organic matter flows into the anoxic tank 10, an excess of organic matter compared to the nitrate nitrogen exists, so that untreated organic matter may exist in the effluent water 2 from the anoxic tank 10. When a high concentration of organic matter exists, microbial flora changes in the second aeration tank 30, so that growth of filamentous fungi is facilitated. Here, if the filamentous fungi grow to excess, a serious problem may occur during separation of supernatant from a settling tank 40.

Thus, in the present invention a first aeration tank 20 containing a carrier for removing the organic matter is interposed between the anoxic tank 10 and the second aeration tank 30 such that the excess organic matter which could not be treated in the aeration tank 10 is removed. Because the carrier for removing the organic matter serves as a habitat for an excess amount of microorganisms such that the microorganisms stuck to the carrier absorb a high concentration of organic matter, the excessive growth of the filamentous fungi can be suppressed effectively.

In general, powdered active carbon has good absorbing capacity and resistance to a shock load caused by a sudden influx of wastewater containing a large amount of organic matter, and is capable of processing wastewater stably even when the wastewater contains a toxic substance, so that powdered active carbon has been widely used to process wastewater. However, the powdered active carbon put in the aeration tank flows out of the aeration tank together with the sludge, so that the powdered active carbon must be supplied continuously into the aeration tank to be kept at a predetermined concentration. Also, when the sludge is returned, the powered active carbon existing in the return sludge causes trouble to a pump. In addition, in order to separate the powered active carbon from the waste sludge for the purpose of regeneration, an extra separator and regenerator for the powdered active carbon is required.

Thus, a carrier for removing organic matter, which is suitable for the wastewater treatment method according to the present invention, is made from a foamed polymer, powdered active carbon attached to the foamed polymer, and an adhesive for sticking the powdered active carbon to the foamed polymer.

The foamed polymer is in a sponge foam or non-woven fabric structure. Preferably, the foamed polymer is formed of polyurethane, polystyrene or polyethylene. The adhesive may be formed of a mixture of acrylic resin and styrene/butadiene Latex(S/B Latex) in a weight ratio of 70:30~90:10.

Preferably, the powdered active carbon and the adhesive exist in a weight ratio of 40:60~50:50.

Preferably, the carrier for removing the organic matter suitable for the wastewater treatment method according to the present invention is manufactured by the following method.

First, the powdered active carbon used in a general wastewater treatment method is added to an adhesive solution containing acrylic resin and S/B Latex and stirred, resulting in a slurry.

It is preferable that the powdered active carbon has a smaller particle size for providing sufficient porosity. For example, the size of the powdered active carbon may be 200 mesh or less. Also, it is preferable that the adhesive solution and the powdered active carbon are mixed in a weight ratio of 90:10~70:30, thereby resulting in a carrier containing the adhesive and the powdered active carbon in a weight ratio of 60:40~50:50 after removing the solvent. Here, if the content of the powdered active carbon is more than the above range, the binding efficiency with the adhesive is decreased. On the other hand, if the content of the powdered active carbon is less than the above range, the adsorptivity of the powdered active carbon is lowered. That is, when the powdered active carbon and the adhesive solution are mixed in the above weight ratio, the resulting carrier can have a predetermined level of strength, abrasion resistance and adsorptivity. And even though the resulting carrier is used for a long time, separation of the powdered active carbon does not occur. Thus, the carrier can be used for several years.

Then, the slurry is coated on the foamed polymer. Preferably, the slurry is coated on the foamed polymer using a roller. Here, it is preferable to evenly coat the foamed polymer such that the slurry penetrates into the inner pores of the foamed polymer. However, any general coating method may be used.

The foamed polymer coated with the slurry is heated at 70~95° C. for 2~3 hours to remove the solvent. During the heating process, curing reaction occurs between the powdered active carbon and the adhesive.

Then, the resulting material is cut to a proper size during the molding process. Here, the carrier is not limited to a specific shape. However, preferably, the carrier is processed into a hexahedral shape having a length, a width and a height all within the range of 0.8~2.0 cm for convenience in the molding process.

The amount of carrier for removing the organic matter put into the first aeration tank 20 is controlled to be 5~25% with respect to the volume of the tank. If the amount of the carrier is less than the above range, the volume of the carrier to which the microorganism is attachable is not high enough. If the amount of the carrier added is more than the above range, smooth circulation of the carrier within the first aeration tank 20 is difficult due to the excessive volume of the carrier.

An effluent water 3 from the first aeration tank 20, whose carbon-to-nitrogen (C/N) ratio is controlled suitably, flows into a second aeration tank 30 containing a carrier for nitrification to undergo nitrification. The condition of the second aeration tank 30 is controlled to be suitable for the activity of nitrifying bacteria removing ammonia nitrogen of the wastewater. That is, because of the low concentration of the organic matter, the nitrifying bacteria whose growth rate is slow relative to other microorganisms can grow much faster in the carrier.

A nitrifying carrier for fixing the nitrifying bacteria must be capable of fixing a large amount of microorganisms and keeping the attachment of the microorganism. For this purpose, the nitrifying carrier must have a high hydrophilicity considering properties of nitrifying bacteria.

However, the nitrifying carrier in use cannot easily absorb the microorganism due to its low hydrophilicity and the microorganism attached to the carrier is also easily detached. Also, most nitrifying carriers have a planar structure (Boler, *The Water Science and Technology*, Vol. 22(1), pp89, 1990), thus the microorganism attachable surface area per unit volume is small. As a result, a large amount of microorganisms cannot be attached to the planar carrier. Also, the attached microorganism cannot be protected from shear stress applied by fluid due to its planar structure, thus the attached microorganism is easily separated.

Thus, preferably, a nitrifying carrier suitable for the wastewater treatment method according to the present invention is polyvinyl alcohol foam carrier or cellulose carrier which has a high hydrophilicity and a large surface area per unit volume due to its high porosity.

The polyvinyl alcohol foam carrier contains a large amount of hydrophilic hydroxyl(—OH) group, thus it is easily hydrated, and hence, easily adsorbs the nitrifying bacteria. Also, the surface area per unit volume is large due to the foamed structure having a large number of pores, and the durability thereof is good. Thus, the manufacture of a nitrifying carrier by cutting a polyvinyl alcohol foam to a proper size and shape increases the efficiency.

Also, the cellulose carrier is manufactured using a hydrophilic cellulose fiber obtained from natural material, e.g., cotton, wood pulp, ramie, hemp, jute and flax, so that it has a high affinity to the nitrifying bacteria. The cellulose carrier is manufactured by the following method.

That is, the method for manufacturing the cellulose carrier includes the steps of: (a) molding a cellulose fiber into a planar shape; (b) infiltrating the planar cellulose fiber with a foaming composition containing polyvinyl alcohol, a cross-linking agent and a foaming agent; (c) foaming the resulting product of the step (b) by dehydrating; (d) infiltrating the resulting product of the step (c) with a reinforcing composition containing polyvinyl alcohol and a cross-linking agent; and (e) drying the resulting product of the step (d) taken out of the composition.

In detail, the cellulose fiber having a length within the range of 0.5~2 mm is pre-formed into a planar shape. This is because it makes the post-treatment easy without the need for dispersing the cellulose fiber in a solvent. The molding method is not limited to a specific method, and a similar method to that of paper making may be used. For example, after preparing a fiber slurry by dispersing the cellulose fiber in water, the prepared fiber slurry is poured into a frame having a predetermined shape (e.g., a hexahedron shape). Then, a predetermined pressure is applied to the fiber slurry in the frame for dehydration, resulting in a cellulose fiber molded into a planar shape.

Then, the cellulose fiber molded into a planar shape is infiltrated with the foaming composition, and then foamed to provide a suitable condition for the growth of microorganisms adsorbed into the carrier. The foaming composition contains polyvinyl alcohol of 0.5~5 wt %, a cross-linking agent of 0.1~5 wt %, a foaming agent of 0.1~1 wt %, and solvent as the remainder. Here, water is preferable as the solvent. Also, any foaming agent capable of generating an excessive amount of nitrogen or carbon dioxide through reaction with the solvent may be used without limitation. In particular, a water-soluble foaming agent is preferred. Preferably, sodium bicarbonate is used as the foaming agent. Also, melamine urea resin or polyamide polyamine epichlorhydrine (PPE) can be used as the cross-linking agent.

For ensuring sufficient foam, the water content of the cellulose fiber molded into a planar shape must be controlled to be within the range of 20~50 wt % of the total weight of the cellulose fiber molded into a planar shape. If the water content is less than the above range, the cellulose fiber molded into a planar shape may be deformed by abrupt foaming. If the water content exceeds the above range, the foaming time is extended. Preferably, the foaming step is performed at 120~150° C. such that the volume of pores per unit gram of the foamed cellulose carrier on the dry basis belongs to the range of 0.3~4.5cm$^3$.

After the foaming step, the foamed cellulose carrier may be shrunk because it does not have a high enough rigidity. Thus, the foamed cellulose carrier is treated with a reinforcing composition in order to stabilize the foamed structure. The reinforcing composition contains a polyvinyl alcohol of 1~5 wt %, a cross-linking agent of 0.1~5 wt % and solvent as the remainder. Here, this cross-linking agent contained in the reinforcing composition is the same as that for the foaming composition, and water is preferable as the solvent. If the concentration of the reinforcing composition exceeds the above range, the excessive amount of components of the composition acts as a contaminant on the surface of the carrier. Also, it is preferable to repeat the treatment with the reinforcing agent such that the final content of the polyvinyl alcohol and the final content of the cross-liking agent become 5~15 wt % and 3~8 wt %, respectively, with respect to the weight of the cellulose fiber.

The reinforcing composition increases the strength of the carrier by chemical binding the polyvinyl alcohol and the cross-linking agent contained therein with cellulose fiber. Also, unreacted cross-linking agent (PPE) has a positive charge under neutral or alkaline conditions, thus the surface of the carrier has a positive charge. Accordingly, most nitrifying bacteria having a negative charge is easily attached to the surface of the carrier. Also, once the nitrifying bacteria is attached to the surface of the carrier, the nitrifying bacteria is hardly separated from the carrier.

Preferably, the resulting product after treatment with the reinforcing composition is dried quickly at about 100° C. such that the reinforcing composition cannot move on the surface of the carrier.

After the drying step, the resulting product may be cut to a proper size and shape. Here, the size and shape of the carrier as a final product are not limited.

The amount of the nitrifying carrier put into the second aeration tank 30 is controlled to be 5~30% with respect to the volume of the tank 30. If the amount of the nitrifying carrier added is less than the above range, the volume of the carrier to which the microorganism is attachable cannot reach the suitable level. If the amount of the carrier added is more than the above range, smooth circulation of the carrier within the second aeration tank 30 is difficult due to the excessive volume of the carrier. Thus, it is difficult to ensure efficient nitrification within the tank 30.

The large amount of nitrifying bacteria grown being attached to the carrier can change ammonia nitrogen of the wastewater into nitrate nitrogen through an aerobic reaction. In particular, the method according to the present invention shows a very high nitrogen removal efficiency during the winter season a time during which the activity of the nitrifying bacteria becomes slow, compared to an active sludge method in which microorganisms are suspended, due to the high concentration of nitrifying bacteria attached to the carrier.

Part of the effluent water 4 from the second aeration tank 30 is returned to the anoxic tank 10 for denitrification, as a return water 5 containing nitrate nitrogen. Also, the remaining effluent water 4 is transferred to the settling tank 40. Part of settled sludge 6 is returned to the anoxic tank 10, as a return sludge 7, and the remaining sludge is discarded as surplus sludge 8. Thus, a supernatant without containing the sludge is obtained as treated water 9.

Also, it is known to those skilled in the art that a perforated plate for preventing overflow of the carrier, or an airlift pump for preventing shifting of the carrier toward an outlet is installed in the aeration tank into which the carrier is put.

In the wastewater treatment method according to the present invention, an excessive amount of organic matter which prevents the growth of the nitrifying bacteria is removed in the leading aeration tank, and the optimal condition where the nitrifying bacteria can multiply is prepared using the nitrifying carrier in which a large amount of attached nitrifying bacterial is grown. As a result, the problem of bulking of the sludge, which was one of serious problems in the conventional active sludge method, can be solved. Also, a large amount of wastewater can be treated within a short time, and the wastewater treatment method according to the present invention can cope with a change in load of the organic matter in the wastewater, thus the wastewater treatment apparatus can be minimized and provides high performance. Also, the nitrogen removal efficiency can be stably maintained even during the winter season when the nitrogen removal efficiency is lowered by a decrease in the activity of the microorganisms.

Until now, the case where loads of the organic matter and ammonia nitrogen of the wastewater are both high has been described. However, in the case where only the load by the organic matter is low, the wastewater may be treated through only nitrification while omitting the organic matter removing step. Also, in the case where the load of the ammonia nitrogen of the wastewater is low, the wastewater may be treated through only the organic matter removing step without the nitrification step.

Hereinafter, the present invention will be described through the following examples. However, the present invention is not limited to the following examples.

Carrier For Removing Organic Matter

Preparation Example 1

Firstly, 160 g of acrylic resin emulsion (N-140, Aurora Chemical Co.), which is equivalent to 64 g of acrylic resin on a solid basis, 40 g of styrene/butadiene Latex (KSL 106, S/B Latex, Kumho Petrochemical Co.), which is equivalent to 16 g of S/B Latex on a solid basis, were completely mixed, and 60 g of powdered active carbon (Union Co., particle size of 200 mesh) was then added to the mixture, resulting in a slurry. The prepared slurry was coated several times on polyurethane having a sponge structure using a roller, and then heated at 75° C. for about 2 hours. The resulting structure was cooled down to room temperature, and cut to make a hexahedral shape having a length, a width and a height all of approximately 1 cm, resulting in a carrier according to the present invention.

EXAMPLE 1

The carrier prepared above was put into an aeration tank of a wastewater treatment apparatus used for treating general organic wastewater, constructed of a first settling tank, the aeration tank and a second settling tank, the carrier taking up 20% of the total volume of the aeration tank.

Then, wastewater was flowed into the wastewater treatment apparatus. Here, the chemical oxygen demand (COD) of the wastewater allowed to flow in was 1000 mg/l and the total retention time was set to 6 hours. Then, the COD of the water which flowed out of the wastewater treatment apparatus was measured by Standard method and COD removal ratio was calculated. The results are tabulated in Table 1. Also, whether separation of powered active carbon and bulking occur during continuous operation for 1 week was investigated, and the degree of the separation of microorganisms was also investigated.

Comparative Example 1

Wastewater was treated under the same conditions as in Example 1, except that an active sludge method without using a carrier was used. The result is tabulated in Table 1.

Comparative Example 2

Wastewater was treated under the same conditions as in Example 1, except that a conventional fixed type carrier, Saran Lock (Kureha Chemical Co., Japan), was put into the aeration tank. The result is tabulated in Table 1.

Comparative Example 3

Wastewater was treated under the same conditions as in Example 1, except that a conventional suspended biomass carrier, Linpor (Linde Co., Germany), was put into the aeration tank. The result is tabulated in Table 1.

TABLE 1

| examples | COD removal ratio (%) | occurrence of bulking | separation of powdered active carbon | degree of separation of microorganism |
|---|---|---|---|---|
| Example 1 | 95 | No | barely occur | barely occur |
| Comparative Example 1 | 12 | Yes | powdered active carbon not used | slight |
| Comparative Example 2 | 89 | No | powdered active carbon not used | moderate |
| Comparative Example 3 | 62 | Yes | powdered active carbon not used | slight |

As can be understood from Table 1, the COD removal ratios when the conventional carriers were used were very high compared to the case of using a general active sludge method, but was still low compared to the case of using the carrier according to the present invention. Also, the separation of the powdered active carbon and microorganisms barely occurred, and bulking did not occur.

Adsorptivity Test

The adsorptivity of the carrier according to the present invention was measured to determine whether the adsorptivity of powdered active carbon was maintained after being coated on a foamed polymer as in the present invention.

An adsorptivity test was performed on the carrier prepared in the Preparation Example 1 using the same wastewater treatment apparatus used as in Example 1. Here, phenol concentration of the influent wastewater measured by a standard method was 450 mg/l. After 2 hours, the phenol concentration of the treated wastewater decreased to 45 mg/l, thus indicating a 90% phenol removal ratio.

As can be understood from the result, the carrier according to the present invention, prepared by coating the powdered active carbon on the foamed polymer, still has a high adsorptivity capable of adsorbing chemicals existing in the wastewater as well as serving as a habitat for microorganisms. Thus, the carrier according to the present invention can be efficient even when wastewater flows in in which the load of organic mater largely varies.

Cellulose Nitrifying Carrier

Preparation Examples 2–6

A cellulose fiber having a length of about 0.5~2 mm was dispersed in water, resulting in slurry. The slurry was poured into a hexahedral frame having a plurality of small holes in the bottom, and a predetermined pressure was applied to the slurry to remove the water, resulting in a cellulose fiber molded into a planar shape. 5 g of polyvinyl alcohol (saponification value 90%, degree of polymerization 1700) and 5 g of PPE were added to 50 g of water, and 0.5 g of sodium bicarbonate, a foaming agent, was added to the mixture, and then stirred until completely mixed, resulting in a foaming composition. Then, the cellulose fiber molded into a planar shape was infiltrated with the foaming composition such that the foaming composition was sufficiently absorbed into the molded fiber. Then, the resulting product was dehydrated using a dehydrator such that the water content of the resulting product was 30% with respect to the weight of the cellulose fiber, and then the dehydrated product was foamed in an oven whose temperature was set to 120~150° C. The resulting foamed body was infiltrated with a reinforcing composition having the composition shown in Table 2, and then stirred for 10 minutes or more such that the reinforcing composition was evenly distributed on the foamed body. Next, the resulting foamed body was squeezed to remove the excessive amount of reinforcing agent from the surface, and put in an oven whose temperature was set to 100° C. Then, the resulting product was dried for a short of about 5 minutes to prevent the reinforcing composition from moving on the surface of the foamed body, resulting in a cellulose nitrifying carrier.

To investigate the effect of the reinforcing composition on the tensile strength of the cellulose nitrifying carrier, the tensile strengths of the nitrifying carriers prepared in the Preparation Examples 2–5 treated with a reinforcing composition and the nitrifying carrier of the Preparation Example 6 not treated with a reinforcing composition were measured by a standard method, and the results are shown in Table 2.

TABLE 2

| | reinforcing composition | | tensile strength (g/cm²) |
|---|---|---|---|
| example | polyvinyl alcohol (wt %) | PPE (wt %) | |
| Preparation Example 2 | 1 | 0.1 | 800 |
| Preparation Example 3 | 3 | 0.3 | 1066 |
| Preparation Example 4 | 4 | 0.4 | 1150 |
| Preparation Example 5 | 5 | 0.5 | 1200 |
| Preparation Example 6 | 0 | 0.0 | 400 |

As can be understood from Table 2, the tensile strength of the carrier increases greatly by treatment with the reinforcing composition. Also, the higher the contents of polyvinyl alcohol and PPE of the reinforcing composition are, the more the tensile strength of the carrier is enhanced. Thus, the cellulose nitrifying carrier according to the present invention can be used for a long time due to its high tensile strength, and has the merit of being a natural material.

Preparation Examples 7–11

The carriers were prepared by the same method as in the Preparation Examples 2–5, except that the contents of polyvinyl alcohol and PPE of the reinforcing composition were varied as shown in Table 3. The charge amount at the surface of each carrier was measured, and the results are shown in Table 3.

TABLE 3

| | reinforcing composition | | positive charge amount (meg/g) |
|---|---|---|---|
| example | polyvinyl alcohol (wt %) | PPE (wt %) | |
| Preparation Example 7 | 1 | 0.0 | 0 |
| Preparation Example 8 | 2 | 0.2 | 1.2 |
| Preparation Example 9 | 3 | 0.6 | 2.6 |
| Preparation Example 10 | 4 | 1.2 | 3.1 |
| Preparation Example 11 | 5 | 2.0 | 4.5 |

As can be understood from Table 3, the positive charge amount could not be measured at the surface in the case where PPE was not added. Also, the more the contents of added PPE were, the higher the positive charge amount at the surface was. The reason why the amount of positive charge increases by treatment with PPE appears to be that unreacted nitrogen atoms of PPE have positive charges. Thus, the amount of positive charge at the surface increases as the PPE content of the reinforcing composition increases. The increase of the positive charge amount at the surface rapidly adsorbs nitrifying bacteria having a negative charge and slow-growing microorganisms. As a result, the time required for initial stabilization of the wastewater treatment apparatus is reduced, thus the total operation time thereof is shortened.

EXAMPLE 2 and Comparative Example 2

In order to measure the wastewater treatment efficiency of the cellulose nitrifying carrier according to the present invention, the wastewater containing ammonia nitrogen was inflowed into a wastewater treatment apparatus with a varying ammonia concentration. Then, the ammonia nitrogen contents of the wastewater treated with the carrier prepared by the Preparation Example 4 (Example 2) and of the wastewater treated by an activated sludge process (Comparative Example 2) were measured by Standard method, the ammonia nitrogen removal ratios were calculated, and the results are shown in Table 4. Here, the total retention time of the wastewater in the wastewater treatment apparatus was 6 hours.

TABLE 4

| ammonia concentration of influent wastewater | ammonia nitrogen removal ratio (%) | |
|---|---|---|
| (mg/l) | Example 2 | Comparative Example 2 |
| 50 | 99 or more | 80 |
| 100 | 99 or more | 50 |
| 200 | 95 | 20 |
| 300 | 90 | 10 |

As can be understood from Table 4, in the case of using the cellulose nitrifying carrier according to the present invention, the ammonia nitrogen removal efficiency was higher compared to the case of using the active sludge method. Also, the efficiency of removing the ammonia nitrogen by the carrier according to the present invention barely changed even when the ammonia concentration of the influent wastewater increased. Thus, the cellulose nitrifying carrier according to the present invention can be stably used for organic wastewater in which the load of the organic matter is high.

EXAMPLE 3

The wastewater was treated using both a carrier for removing organic matter and a nitrifying carrier. In a wastewater treatment apparatus used, the volumetric ratio of an anoxic tank, a first aeration tank and a second aeration tank was 1:1:1, and the organic matter removing carrier of the Preparation Example 1 was put in the first aeration tank and the cellulose nitrifying carrier of the Preparation Example 10, was put in the second aeration tank, with a 10% volumetric ratio respectively.

Then, the influent wastewater was treated at room temperature (25° C.). Here, the biological oxygen demand (BOD) of the influent wastewater was 120 mg/l and total Kjeldahl nitrogen (TKN) thereof was 60 mg/l. By changing the retention time from 8 hours to 3 hours, i.e., by gradually increasing the inflowing amount of wastewater, the BOD and TKN of the outflow wastewater were measured by Standard method, and BOD removal ratio and TKN removal ratio were calculated. The results are shown in Table 5.

EXAMPLE 4

The wastewater was treated by the same method as in Example 3, except that the organic matter removing carrier of the Preparation Example 1 and the cellulose nitrifying carrier of the Preparation Example 4 were used.

Comparative Example 3

The organic wastewater was treated by the MLE (Modified Ludzack Ettinger) method utilizing a general suspended microorganism, under the same conditions as in Example 3, and the results are shown in Table 5. Here, each volume of the aeration tank (two aeration tanks were used) was equal to the volume of the first and second aeration tanks in Example 3, respectively.

As shown in Table 5, the BOD removal ratio and the TKN removal ratio decreased as the retention time became shorter. However, the degree of the decrease in BOD removal ratio and TKN removal ratio were smaller in the case of using the method according to the present invention than in the case of using the conventional method. The reason for maintaining such a high removal ratio even when the amount of influent wastewater increases is that the carrier is capable of adsorbing a large amount of microorganisms. The concentration of the microorganisms within the aeration tank was 2000 mg/l for suspended microorganisms and 2500 mg/l for microorganisms attached as a biofilm, i.e., a total of 4500 mg/l in Examples 3 and 4, and only a total of 2000 mg/l in the Comparative Example 1.

TABLE 5

| retention time (hrs) | BOD removal ratio (%) | | | TKN removal ratio (%) | | |
|---|---|---|---|---|---|---|
| | Example 3 | Example 4 | Comparative Example 3 | Example 3 | Example 4 | Comparative Example 3 |
| 8 | 95 | 95 | 95 | 99 | 99 | 95 |
| 6 | 95 | 93 | 93 | 99 | 99 | 90 |
| 4 | 93 | 85 | 85 | 95 | 96 | 75 |
| 3 | 92 | 70 | 70 | 95 | 96 | 50 |

EXAMPLES 5–6

For the purpose of comparing the wastewater treatment efficiency during the winter season, the wastewater was treated in the same manner as in Examples 3 and 4, except that the retention time was set to 6 hours, and the temperature of the wastewater was changed to 25° C., 20° C., 15° C. and 8° C.

The BOD and TKN of the effluent water passed through the wastewater treatment apparatus were measured by Standard method, and BOD and TKN removal ratios according to the temperature decrease of the wastewater were calculated. The results are shown in Table 6.

Comparative Example 4

The wastewater was treated under the same conditions as in Example 5, using the MLE process used in Comparative Example 3, and the results are shown in Table 6.

TABLE 6

| tempera-ture (° C.) | BOD removal ratio (%) | | | TKN removal ratio (%) | | |
|---|---|---|---|---|---|---|
| | Example 5 | Example 6 | Comparative Example 4 | Example 5 | Example 6 | Comparative Example 4 |
| 25 | 95 | 95 | 95 | 99 | 99 | 95 |
| 20 | 94 | 95 | 90 | 97 | 99 | 93 |
| 15 | 93 | 92 | 84 | 95 | 96 | 80 |
| 8 | 90 | 90 | 80 | 90 | 91 | 50 |

As shown in Table 6, in the wastewater treatment method according to the present invention, the high TKN removal ratio was maintained and the BOD removal ratio was enhanced at a low temperature. This is because the organic matter was removed in the leading aeration tank, and the conditions suitable for the attached-growth of the nitrifying bacteria were created using the nitrifying carrier.

INDUSTRIAL APPLICABILITY

As described above, in the wastewater treatment method according to the present invention, an excessive amount of organic matter which prevents the nitrifying bacteria from growing is removed in the leading aeration tank, and the condition of the aeration tank is optimized using the nitrifying carrier to which a great amount of nitrifying bacteria can be attached for growth, such that the nitrifying bacteria can multiply therein. As a result, a large amount of wastewater can be treated within a short time, and it is possible to stably cope with a change in load of the organic matter of the wastewater. Thus, the wastewater treatment apparatus can be smaller, and an improvement in performance thereof can be expected. Also, the wastewater can be treated stably during the winter season when the activity of the nitrifying bacteria becomes low, so that the wastewater treatment method according to the present invention can be applied to most wastewater treatment plants, e.g., sewage treatment plants, excrement treatment plants, livestock and industrial wastewater treatment plants and the like.

What is claimed is:

1. A wastewater treatment method comprising the steps of:
    (a) denitrifying wastewater flowing into an anoxic tank by reducing the nitrate nitrogen into gaseous nitrogen using denitrifying bacteria being resident in the anoxic tank, and organic matter of the wastewater flowing into the anoxic tank;
    (b) making the carbon-to-nitrogen (C/N) ratio of the wastewater having undergone the step (a) suitable for a subsequent nitrification step after the wastewater flows into a first aeration tank by decomposing an excessive amount of organic matter using aerobic microorganisms attached to a carrier;
    (c) changing ammonia nitrogen of the wastewater having undergone the step (b) into nitrate nitrogen after the wastewater flows into a second aeration tank by using nitrifying bacteria attached to a carrier;
    (d) returning part of the wastewater having undergone the step (c) to the anoxic tank, while the remaining wastewater flows into a settling tank; and
    (e) returning part of the sludge discharged from the settling tank to the anoxic tank, discarding the remaining sludge as surplus sludge, and obtaining a supernatant separated from the sludge settled in the settling tank as the treated water.

2. The method of claim 1, wherein the carrier used in the step (b) comprises:
    a foamed polymer;
    powdered active carbon attached to the foamed polymer; and
    an adhesive for sticking the powdered active carbon to the foamed polymer.

3. The method of claim 2, wherein the foamed polymer is polyurethane, polystyrene or polyethylene, having a sponge foam or non-woven fabric structure.

4. The method of claim 2, wherein the adhesive is a mixture of acrylic resin and styrene/butadiene Latex (S/B Latex) in a weight ratio of 70:30~90:10.

5. The method of claim 2, wherein the powdered active carbon and the adhesive exist in a weight ratio of 40:60~50:50.

6. A method of claim 2, further comprising the step of preparing the carrier used in step (b) of claim 1, said carrier preparing step comprising the steps of:
    (a) forming a slurry by mixing an adhesive solution and a powdered active carbon in a weight ratio of 90:10~70:30;
    (b) coating the slurry on a foamed polymer, and evaporating solvent from the adhesive solution by heating the resulting product; and
    (c) molding the resulting product of the step (b).

7. The method of claim 6, wherein heating of the step (b) is performed at 70~95° C. for 2~3 hours.

8. The method of claim 1, wherein said carrier used in the step (c) comprises a polyvinyl alcohol foam carrier or a cellulose fiber carrier.

9. The method of claim 8, wherein the cellulose fiber is obtained from cotton, wood pulp, ramie, hemp, jute or flax.

10. The method of claim 8, further comprising the step of preparing the cellulose carrier by the steps of:
    (a) molding a cellulose fiber into a planar shape;
    (b) infiltrating the planar cellulose fiber with a foaming composition containing polyvinyl alcohol, a cross-linking agent and a foaming agent;
    (c) foaming the resulting product of the step (b) by dehydrating;
    (d) infiltrating the resulting product of the step (c) with a reinforcing composition containing polyvinyl alcohol and a cross-linking agent; and (e) drying the resulting product of the step (d) taken out of the composition.

11. The method of claim 10, wherein the foaming composition comprises 0.5~5 wt % of polyvinyl alcohol, 0.2~5 wt % of cross-linking agent, 0.1~1 wt % of foaming agent, and solvent as the remainder.

12. The method of claim 11, wherein the cross-linking agent is melamine urea resin or polyamide polyamine epichlorhydrine (PPE).

13. The method of claim 10, wherein the reinforcing composition comprises 1~5 wt % of polyvinyl alcohol, 0.1~5 wt % of cross-linking agent, and solvent as the remainder.

14. The method of claim 13, wherein the cross-linking agent is melamine urea resin or polyamide polyamine epichlorhydrine (PPE).

15. The method of claim 10, wherein dehydration of the step (c) is performed such that the water content of the planar cellulose fiber before foaming is maintained at 20~50% based on the weight of the planar cellulose fiber.

16. The method of claim 10, wherein foaming in the step (c) is performed at 120~150° C. such that the volume of pores per unit gram of the foamed cellulose carrier on the dry basis is in the range of 0.3~4.5cm$^3$.

17. A wastewater treatment method comprising the steps of:
   (a) denitrifying wastewater flowing into an anoxic tank by reducing the nitrate nitrogen into gaseous nitrogen using denitrifying bacteria being resident in the anoxic tank, and organic matter of the wastewater flowing into the anoxic tank;
   (b) making the carbon-to-nitrogen (C/N) ratio of the wastewater having undergone the step (a) suitable for a subsequent nitrification step after the wastewater flows into a first aeration tank by decomposing an excessive amount of organic matter using aerobic microorganisms attached to a carrier;
   (c) changing ammonia nitrogen of the wastewater having undergone the step (b) into nitrate nitrogen after the wastewater flows into a second aeration tank by using nitrifying bacteria attached to a carrier if the load of ammonia nitrogen of the wastewater to be treated exceeds a predetermined level;
   (d) returning part of the wastewater having undergone at least step (b) to the anoxic tank, while the remaining wastewater flows into a settling tank; and
   (e) returning part of the sludge discharged from the settling tank to the anoxic tank, discarding the remaining sludge as surplus sludge, and obtaining a supernatant separated from the sludge settled in the settling tank as the treated water.

18. A wastewater treatment method comprising the steps of:
   (a) denitrifying wastewater flowing into an anoxic tank by reducing the nitrate nitrogen into gaseous nitrogen using denitrifying bacteria being resident in the anoxic tank, and organic matter of the wastewater flowing into the anoxic tank;
   (b) making the carbon-to-nitrogen (C/N) ratio of the wastewater having undergone the step (a) suitable for a subsequent nitrification step after the wastewater flows into a first aeration tank by decomposing an excessive amount of organic matter using aerobic microorganisms attached to a carrier if the load by the organic matter of the wastewater to be treated exceeds a predetermined level;
   (c) changing ammonia nitrogen of the wastewater having undergone at least step (a) into nitrate nitrogen after the wastewater flows into a second aeration tank by using nitrifying bacteria attached to a carrier;
   (d) returning part of the wastewater having undergone the step (c) to the anoxic tank, while the remaining wastewater flows into a settling tank; and
   (e) returning part of the sludge discharged from the settling tank to the anoxic tank, discarding the remaining sludge as surplus sludge, and obtaining a supernatant separated from the sludge settled in the settling tank as the treated water.

* * * * *